A. N. AMES.
DROP STITCH AND LACEWORK MECHANISM FOR CIRCULAR KNITTING MACHINES.
APPLICATION FILED AUG. 4, 1906.

981,351. Patented Jan. 10, 1911.
8 SHEETS—SHEET 4.

Fig. 4.

Witnesses:
Jas J Maloney
G. H. Williams

Inventor:
Arthur N. Ames
by J. P. and H. S. Swenson
Attys.

A. N. AMES.
DROP STITCH AND LACEWORK MECHANISM FOR CIRCULAR KNITTING MACHINES.
APPLICATION FILED AUG. 4, 1906.

981,351.

Patented Jan. 10, 1911.

A. N. AMES.
DROP STITCH AND LACEWORK MECHANISM FOR CIRCULAR KNITTING MACHINES.
APPLICATION FILED AUG. 4, 1906.

981,351.

Patented Jan. 10, 1911.

UNITED STATES PATENT OFFICE.

ARTHUR N. AMES, OF FRANKLIN FALLS, NEW HAMPSHIRE, ASSIGNOR TO ACME KNITTING MACHINE & NEEDLE COMPANY, A CORPORATION OF NEW HAMPSHIRE.

DROP-STITCH AND LACEWORK MECHANISM FOR CIRCULAR-KNITTING MACHINES.

981,351.           Specification of Letters Patent.     Patented Jan. 10, 1911.

Application filed August 4, 1906. Serial No. 329,239.

*To all whom it may concern:*

Be it known that I, ARTHUR N. AMES, a citizen of the United States, residing in Franklin Falls, in the county of Merrimack and State of New Hampshire, have invented an Improvement in Drop-Stitch and Lacework Mechanism for Circular-Knitting Machines, of which the following description, in connection with the accompanying drawings, is a specification, like letters on the drawings representing like parts.

The present invention relates to a circular knitting machine, and is embodied in a machine of that type known as the full automatic, in which the machine, once started, will knit a stocking complete; the transfer from the circular knitting for the leg and foot to the reciprocating knitting for the heel and toe and vice versa being accomplished by automatic pattern mechanism.

The invention is embodied in a novel construction and arrangement of the machine whereby a drop stitch effect can be obtained entirely around the leg of the stocking, the drop stitch commonly being dependent upon the removal of certain of the needles from that part of the needle cylinder where the needles are only brought into operation during the circular knitting. It is, of course, impracticable to remove any of the needles from that part of the cylinder where the reciprocating knitting takes place during the formation of the heel and toe of the stocking, since it is essential that such knitting should be solid throughout.

In accordance with the invention, the needle cylinder is provided with a certain number of needles corresponding to those removed from the cylinder, these special needles having butts shorter than those of the ordinary long and short butt needles commonly employed, and being controlled by devices which permit such drop stitch needles to be carried downward entirely below the work during the knitting of the leg and then automatically restored to the main needle cam cylinder ledge during the reciprocating operation so as to enter into the knitting at that period. The mechanism is further so arranged that these needles remain in operation during the circular knitting between the heel and toe, since it is desirable that the sole of the stocking should be knit solid, although the drop stitches may be carried down along the instep as is common when certain needles are removed from the cylinder to obtain the drop stitch effect.

A further feature of the invention consists in a novel construction and arrangement whereby a lace effect can be obtained in addition to the ordinary drop stitch, this being accomplished by providing the machine with means whereby certain needles located between the drop stitch needles or in the spaces where needles have been removed from the cylinder are caused to operate intermittingly, or to tuck, being prevented from knitting in a stitch during a number of courses, and then being caused to operate one or more times to knit in the threads which have been laid across between the solid knit portions. The needles depended upon for obtaining this lace effect are, in accordance with the invention, acted upon by blanks or blind needles, as they will hereinafter be termed, which consist of rods provided with butts similar to the butts of the needles, the butts of said rods being acted upon by the cam ledge of a supplemental cam cylinder below the main cam cylinder, and being under the control of suitable pattern mechanism so that during the proper number of courses they are pushed upward at each rotation, causing the knitting needles controlled by them to be also pushed upward above the work so that the butts are removed from the influence of the main cam cylinder ledge, these needles, therefore, being carried above the work each time the cam comes around, for such number of courses as may be necessary, the thread being simply carried past the outsides of the lifted needles but not being knit in.

The cam ledge of the supplemental cam cylinder is provided with switches controlled by suitable pattern mechanism, so that the needles controlled by the blind needles will be permitted at such periods as may be necessary to be acted upon in the usual way by the main cam cylinder, so as to enter into the knitting operation.

The pattern mechanism for the supplemental cam cylinder is of novel construction and arrangement, and the supplemental cam cylinder switches are so arranged, in conjunction with the blind needles, as to admit of the omission of the lace stitch altogether along the heel, sole, and toe where the knitting is to be solid, and also, if desired, along a portion of the leg.

In addition to the general features above outlined, the machine embodying the invention contains minor features of novel construction and arrangement which will be hereinafter more fully described.

The driving mechanism of the machine is substantially like that employed in machines of this type as heretofore constructed, see U. S. Patent No. 461,357, granted to W. H. and G. D. Mayo, Oct. 31, 1891, the main shaft A (Fig. 1) having sleeved thereon a driving pulley $A^2$ and a loose pulley $A^3$, the driving pulley having connected therewith a driving gear $A^4$ which meshes with a large gear $A^5$ which is driven continually when the belt is on the pulley $A^2$. The said large gear $A^5$ is connected by means of a pitman $A^6$ with a gear segment $A^7$ upon a rock shaft $A^8$, which, through the action of said pitman, is oscillated continuously during the operation of the machine. The said gear segment is in mesh with a gear $A^{10}$ on the shaft A, the said gear $A^{10}$, therefore, being oscillated so long as the machine is in operation. Interposed between the driving gear $A^4$ and the oscillated gear $A^{10}$ is a clutch member B, which is shown as a sleeve splined on the shaft A so as to be connected therewith, so far as relates to rotating or oscillating motion, the said clutch member B having projections $B^2$ and $B^3$ which are adapted to engage respectively with shoulders in the gears $A^4$ and $A^{10}$. When, therefore, the clutch member B is in engagement with the gear $A^4$, as shown, the shaft A will be rotated, while if the clutch member B is shifted to the other position so that the said clutch member is connected with the gear $A^{10}$, the said shaft will be oscillated. The shaft A is further provided with a gear $A^{12}$ which is in mesh with the gear C on a stub shaft $C^2$, which gear C is also provided with a bevel gear portion $C^3$ adapted to drive the cam cylinders, as will be more fully described hereinafter, so that the said cam cylinders are rotated or oscillated in accordance with the operation of the shaft A, the rotary movement of the cylinder performing the circular knitting operation, while the oscillating movement thereof performs the reciprocating knitting operation by which the heel and toe of a stocking are formed.

Figure 1:
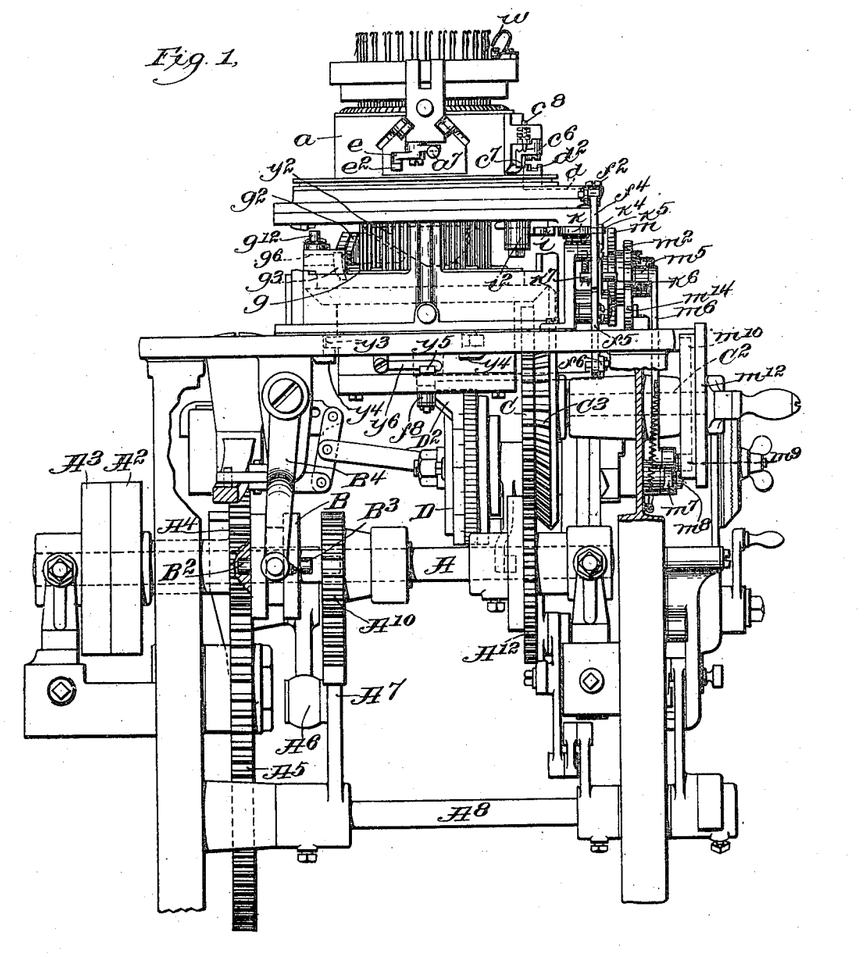
Figure 1 is a front elevation of a machine embodying the invention.

In the operation of knitting a stocking, the machine starts with the clutch member B in the position shown in Fig. 1, so that a rotary movement is imparted to the cam cylinders, producing the circular knitting operation which knits the leg of the stocking. When the leg has been completed, the clutch member B is automatically shifted so that said member B becomes engaged with the gear $A^{10}$, the shaft A then reciprocating, instead of oscillating, in accordance with the operation of the mechanism previously described. The shifting of the clutch member B is produced through the agency of a pattern cam wheel D, the specific construction of which is not herein shown and described, since it forms no part of the present invention. The said cam wheel is fully described in another application filed by me Feb. 19, 1906, Serial No. 301,801, to which application reference may be made. In order to knit stockings with lines of drop stitches extending down and completely around the leg and at the same time to arrange for the lines of drop stitches extended along the instep while the sole is solid knit, it is necessary to provide the machine with means for controlling certain of the needles so as to render them inactive during the knitting of the leg, but active during the knitting of the foot. The drop stitches can be provided for at that part of the machine where the front of the leg and the upper portion of the foot are knit, by merely removing from the machine one or more needles corresponding to each line of drop stitches, since these needles do not perform any function in the knitting of the heel and toe of the stocking.

It is impracticable, however, to remove any of the needles from that part of the cylinder where the reciprocating knitting is carried on for the heel and toe, or where the solid part of the circular knitting comes along the sole. In accordance with the present invention, therefore, means are provided for controlling, without removing, any desired number of needles to correspond to the drop stitch lines, so that the said needles may be rendered inoperative during the knitting of the leg or a part thereof and again placed in operation during the knitting of the heel, sole and toe. For this purpose the main cam cylinder $a$ is provided, in addition to the normal long and short butt needles E and $E^2$, with a series of needles $b$ (hereinafter referred to as drop-stitch needles) having still shorter butts $b^2$, there being a ledge or shoulder $a^2$ below the main ledge $a^3$, and means for dropping the drop-stitch needles to said lower ledge where they are entirely below the line of knitting, and again raising them from said ledge when they are intended to be again placed in operation. As herein shown, the main ledge $a^3$, Figs. 7, 8 and 9, which is provided with the usual switch channel and switch for raising and lowering the needles in the circular knitting operation, and with the lifting and lowering devices $a^{50}$ and $a^{51}$, Fig. 9, for lifting and restoring the needles consecutively during the reciprocating knitting movement, is provided, in addition, with a cam or movable slide member $a^4$, which in its normal position projects into the cam cylinder $a$ far enough to afford a support for the shortest butt needles $b$, but is arranged to be drawn outward until it fails to afford such support; without, however, removing the support for the usual long and short butt needles employed in the ordinary knitting machine. This slide member $a^4$, when withdrawn from the path of the needles of shortest butts, allows these needles to drop to the supplemental ledge $a^2$. In order to insure the dropping of the needles, a deflector $a^5$ is located above the slide member $a^4$, so that the needles dip at each rotation of the cam, the slide member $a^4$, if in operative position, restoring them to the ledge $a^3$, and, if withdrawn, allowing the short butt needles to be acted on by the deflecting surface $a^6$, which insures the removal of the butts to the lower ledge $a^2$. For a drop stitch operation of the kind described, therefore, the machine is provided along the part where the solid knitting must be performed with a number of the drop stitch needles $b$, spaced to correspond to the positions where the lines of drop stitches are desired, and the slide $a^4$ is moved out of the path of said needles, so that they are all dropped to the lower ledge and remain below the work, performing no function in the knitting operation so long as a plain drop stitch is to be made all around the stocking. In the rotation of the cam, the slide $a^4$ reaches the needles before they are reached by the regular knitting cams, so that the drop-stitch needles are carried down to the lower ledge before the thread reaches them. In traveling down, the needles simply pass through the old loops which are shed by the latches; and when the needles are restored to the ledge $a^3$ so as to enter into the knitting operation, the latches stand above the old loops and clear thereof, ready to operate in the usual way when actuated by the regular knitting cams.

Figure 2:
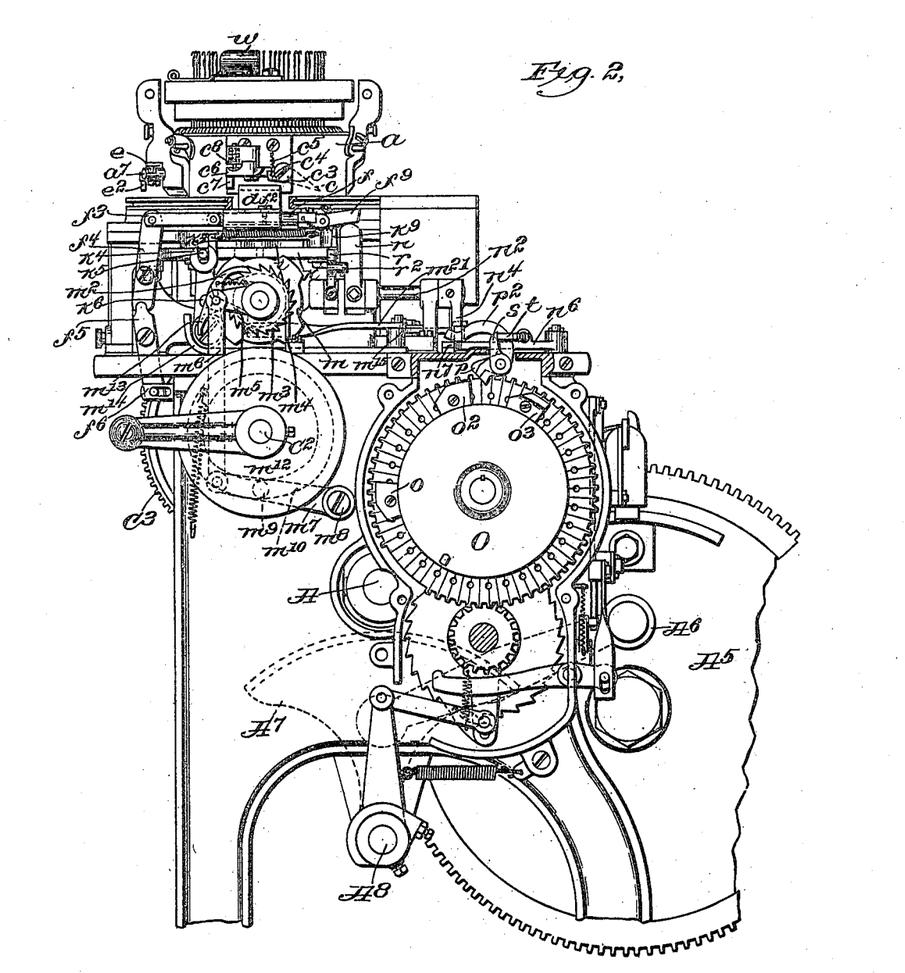
Fig. 2 is a side elevation of the same.

When the leg of the stocking is finished and it is necessary to begin the solid knitting around the heel, the drop stitch needles are restored to the ledge $a^3$ by means of a switch $c$, which is arranged to be dropped into the path of the butts of the needles resting on the ledge $a^2$, this switch thus guiding the needles upward to the ledge $a^3$, the slide cam $a^4$ being meanwhile pushed in, so as to keep the said needles on the said ledge whereby they enter into the knitting operation. The opening from the lower to the upper ledge is closed by a latch member $c^2$ to prevent the needles resting on the ledge $a^3$ from catching. Since the slide cam $a^4$ must be pushed inward when the switch $c$ is depressed, and vice versa, both of these members are controlled by a common actuating device $d$, which is under the control of suitable pattern mechanism, as will be hereinafter described, the said actuating device $d$ being herein shown as a slide adapted to be moved toward and from the cylinder, and having a cam groove or surface $d^2$ which acts upon the slide cam $a^4$ and switch $c$ as follows: The switch $c$ is operated first and is located in the cam cylinder $a$ in advance of the slide cam $a^4$, the said switch having a pivotal support consisting of a pin $c^3$ having a horizontal bearing in the wall of the cylinder $a$, and being provided with a lateral projection $c^4$ having an inclined surface which is held by means of a spring $c^5$ in engagement with a similar inclined surface at the end of a lever $c^6$ having a vertical bearing in a lug secured to the side of the cylinder. This lever is provided with a projection $c^7$ in the path of the cam groove $d^2$ so as to travel through the same as the cam cylinder $a$ rotates. Assuming that the slide $d$ has been moved to the position shown, the lever $c^6$ will have been turned on its pivot, so that the inclined surface thereof has been moved into engagement with the inclined surface of the lateral projection $c^4$, thus depressing the said lateral projection and turning the pivot pin $c^3$, so that the switch $c$ is lifted against the stress of the spring $c^5$, thus leaving the lower ledge $a^2$ free from obstruction. Thus, any needles which may have been dropped to said lower ledge will remain idle below the work, and not enter into the knitting operation. The lateral projection $c^4$ is kept in its depressed position until the slide $d$ is again shifted, the lever $c^6$ being acted upon, as best shown in Fig. 2, by a spring pressed retaining pin $c^8$ mounted in the lug which affords the bearing for the lever $c^6$, which is provided with notches or channels to receive the said pin so as to be held in either position until acted upon by the slide $d$. In order to drop the needles $b$ to the said ledge, $a^2$, the slide cam $a^4$ is then acted upon and withdrawn from the path of the butts of said needles, the said slide cam $a^4$ being shown as provided with a stem $a^7$ which affords a sliding support or bearing therefor, in the wall of the cylinder $a$, the said stem having a slot $a^8$ which receives one end of a pivoted lever $e$, having a projection $e^2$ which passes through the cam groove $d^2$, causing the lever $e$ to rock on its pivot, thus producing the necessary longitudinal movement of the stem $a^7$ to withdraw the cam $a^4$ from the path of the short butt needles on the upper ledge $a^3$.

The movement of the slide $d$ is controlled by a rod $f$, having a projection $f^2$ entering a slot $d^3$ in the slide, the said slot having curved walls, so that a longitudinal movement of the rod $f$ will produce a corresponding longitudinal movement of the slide, in a transverse direction, as illustrated. The initial movement of the said slide $d$, which is under the control of the main pattern mechanism is produced as follows: The rod $f$ is connected by means of a link $f^3$ with a lever $f^4$ (Figs. 2, 3 and 5) which is pivoted in the frame of the machine, the opposite end of said lever being joined with another pivoted lever $f^5$ which is connected with a link $f^6$ which extends across the machine and is connected with an elbow lever $f^7$, one end of said elbow lever having a cam roll $f^8$ in the path of the projection $D^2$ on the main pattern cam wheel $D$. There is a loose or lost motion connection between the lever $f^5$ and the link $f^6$, since the movement of the slide $d$ in the opposite direction is under the control of a different instrumentality, and takes place without any corresponding movement of the aforesaid link. Such restoring movement, which takes place when the short butt needles are to be restored to the main ledge $a^3$, and which involves the return movement of the switch $c$ and the cam member $a^4$, will be more fully described in connection with the lace work mechanism which also forms part of the invention.

The tucked stitch mechanism is embodied in means for tucking or accumulating loops to give the lace effect by utilizing intermittingly operated needles, which are prevented from operating during one or more courses, being at this period held entirely above the work so that the yarn is simply laid around the needle shanks, and then being depressed and operated one or more times in the ordinary way to knit in the threads previously laid around them, the said intermittingly operated needles being preferably between adjacent drop stitch needles, or in the spaces where the needles have been removed, so that there is a space between the lines where the lace threads are gathered together, giving the desired lace effect. The needles are pushed upward before the thread reaches them, and held up while the knitting cams travel past, so that their hooks do not engage the thread at all. The lace effect can be obtained completely around the leg of the stocking, and over the instep thereof without interfering with the solid knitting along the heel, sole and toe. The lace effect can also be obtained without dropping stitches at all, by placing these intermittingly operated tuck-needles, as they may be called, at intervals around the cylinder, without removing or dropping any of the others. While, therefore, the drop stitch mechanism and the lace effect mechanism can be used independently of each other, they most naturally go together in the knitting of the stocking, and in the embodiment of the invention herein shown, the several instrumentalities which perform the drop stitch knitting and lace effect knitting are shown as actually coöperating with each other, although it is obviously not essential that such coöperation should take place.

Figure 7:
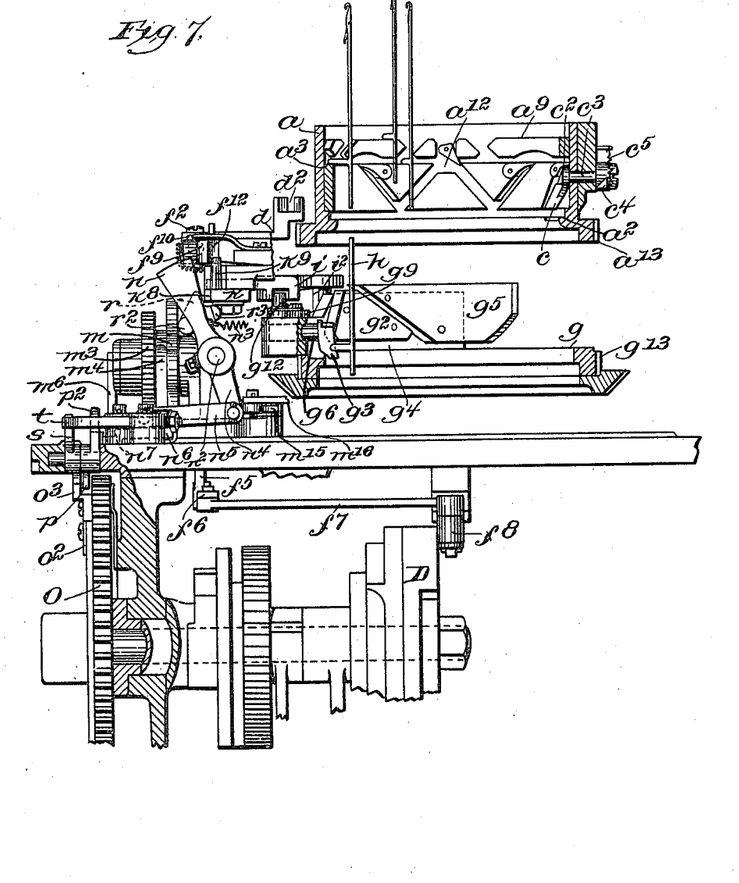
Fig. 7 is a partial rear elevation with the cam cylinder shown in section, and the lace pattern mechanism shown in a different position from that shown in Fig. 4.
Figure 8:
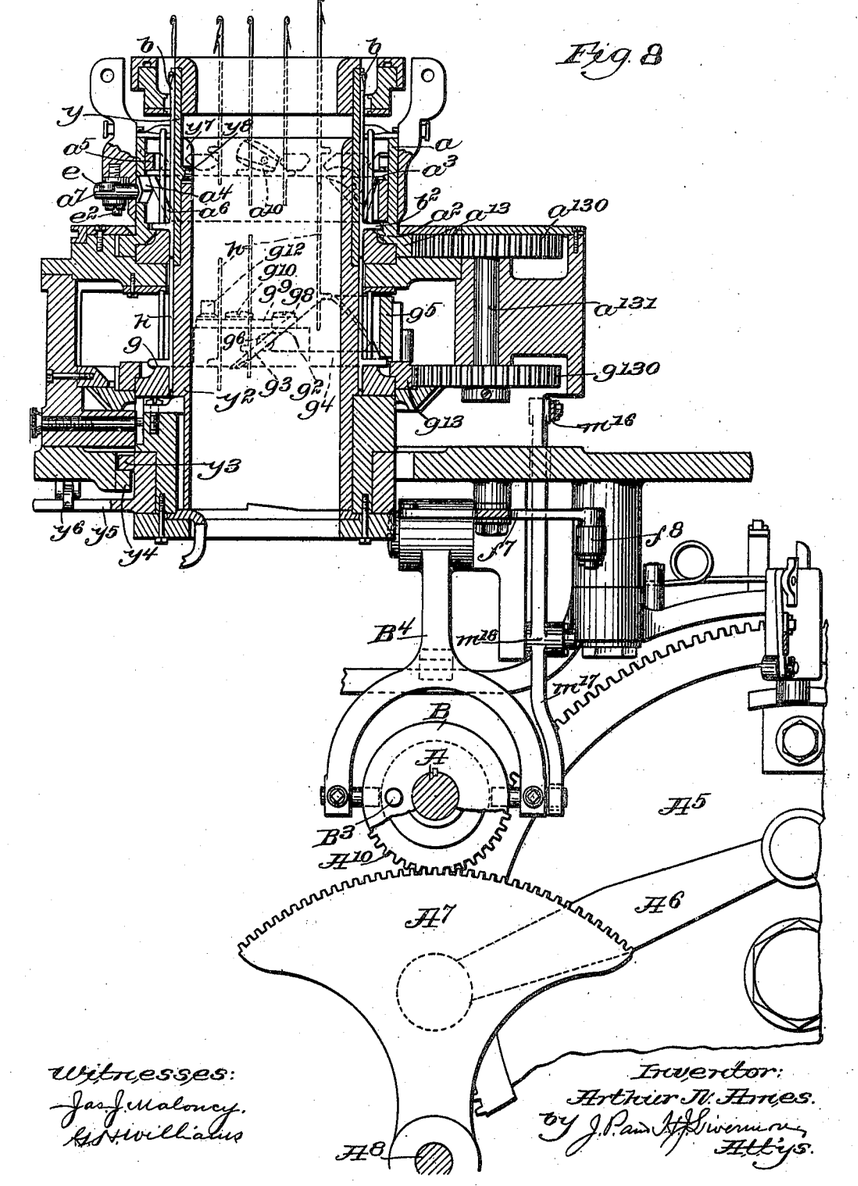
Fig. 8 is a vertical section on line $x^8$ of Fig. 3.
Figure 9:
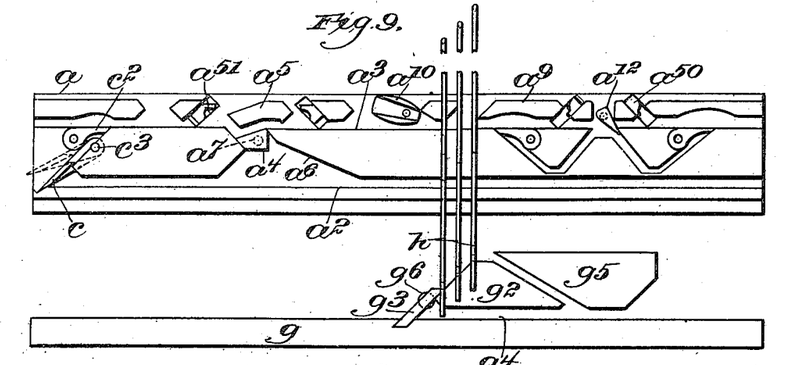
Fig. 9 is a developed view of both cam members.
Figure 10:
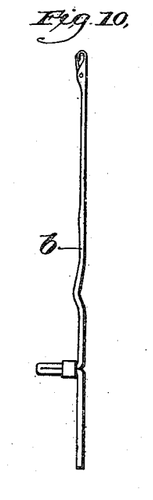
Figs. 10, 11, 12, 13 and 14 are full sized views of the several knitting and blind needles employed.
Figure 11:
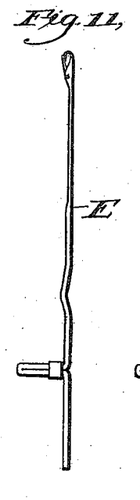
Figures 12, 15:
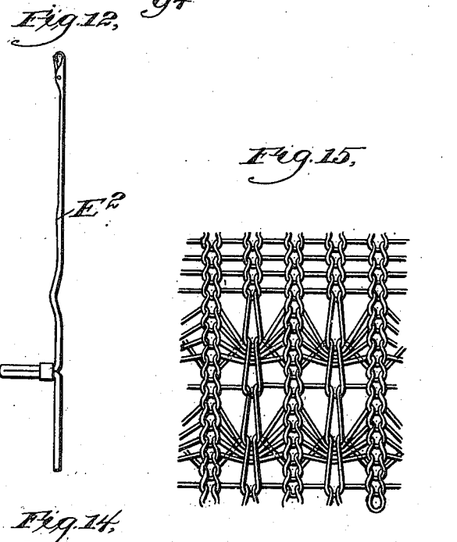
Fig. 15 is an enlarged diagram view of the fabric.
Figures 13, 14:
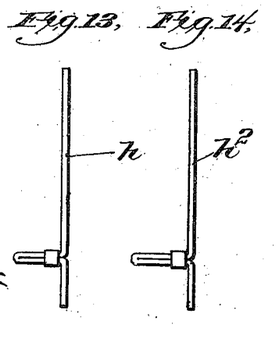

In order to obtain the lace effect, the machine has a supplemental ledge $g$, best shown in Figs. 7, 8 and 9, and a series of what may be termed "blind needles", that is to say, needle-bars $h$ and $h^2$, Figs. 13 and 14, adapted to coöperate with the lower ends of the regular knitting needles, the said blind needles having long and short butts for a purpose to be hereinafter described. The ledge $g$, with its accompanying parts, which will be hereinafter termed the "supplemental cam cylinder", is provided with a deflector $g^2$, the purpose of which is to coöperate with a switch $g^3$ in moving the blind needles up, once at each revolution of the cylinder, assuming that the switch $g^3$ is in position to engage the needle-butts. There is a channel $g^4$ below the deflector $g^2$ to admit the butts in case the switch $g^3$ is entirely removed from the path thereof, so that the blind needles $h$ will remain on the ledge $g$, except when the switch $g^3$ projects across the same. The blind needles $h$ and $h^2$ are arranged in a needle cage similar to that employed for the regular knitting needles, there being one blind needle in alinement with and coöperating with each of the regular knitting needles which is to be employed in the special lace work.

In the first part of the circular knitting, that is, after the blind needles $h$ have been put into operation to produce the lace effect all around the stocking, both the long and short butt needles are acted upon, the action being controlled through the switch $g^3$ by pattern mechanism which will be hereinafter described, all of the said needles being caused to operate during such a number of courses as may be desired to prevent the knitting needles controlled thereby from entering into the knitting operation, then being put out of action during one or more courses to permit the knitting needles to operate in the usual way and stitch in the threads not previously acted upon. When it comes to knitting the heel, all of the blind needles are put out of action, this being solid knitting throughout; and when the machine is again shifted to circular knitting to knit the foot, a portion of the blind needles corresponding to the needles which knit the sole are put out of action, while the others still operate in response to the pattern mechanism so as to carry the lace effect along over the instep. This is the purpose of providing the blind needles with long and short butts, the long butt needles $h^2$ only being used during the knitting of the foot.

The butts of all of the blind needles are acted on by the switch $g^3$ to guide them up into contact with the surface of the deflector $g^2$ when they are to operate upon the knitting needles. The deflector $g^2$ is just in advance of the up and down knitting channel of the cam cylinder $a$, so that when the blind needles are in operation they push up the knitting needles before the latter reach the knitting channel, the needles being pushed up to such a position that the butts overlie the upper ledge $a^9$ of the main cam cylinder $a$.

The knitting needles remain above the ledge $a^9$ during nearly one rotation of the cylinder, and are then deflected downward to the regular knitting ledge by means of the switch $a^{10}$ which is the switch employed at the beginning and end of the reciprocating operation in the regular knitting machine. In the meantime, the blind needles $h$ have been restored to the ledge $g$ by means of the deflector $g^5$, and at the end of a rotation are again under control of the switch $g^3$, so that they operate or not upon the knitting needles according to the position of said switch. So long, therefore, as the switch $g^3$ remains in place, the knitting needles corresponding to the blind needles $h$ will be pushed up above the work before reaching the knitting channel $a^{12}$, so that no stitch will be formed. The said blind needle switch $g^3$ is herein shown as provided with a stem $g^6$ provided with rack teeth $g^7$ intermeshing with a pinion $g^8$, so that by turning the said pinion the switch $g^3$ may be moved in and out radially with relation to the cylinder to such extent as may be desired. The stem $g^6$ bears in an opening formed in a lug on the supplemental cam cylinder. In the construction shown, the said switch $g^3$ is arranged to have three positions; one in which it does not project into the path of the butts of the needles at all, so that none of the blind needles are operated; a second or opposite position in which it projects far enough in to engage the butts of all the blind needles; and a third or intermediate position in which it projects in far enough to engage the butts of the long butt blind needles, but not those of the short butt blind needles.

Figure 3:
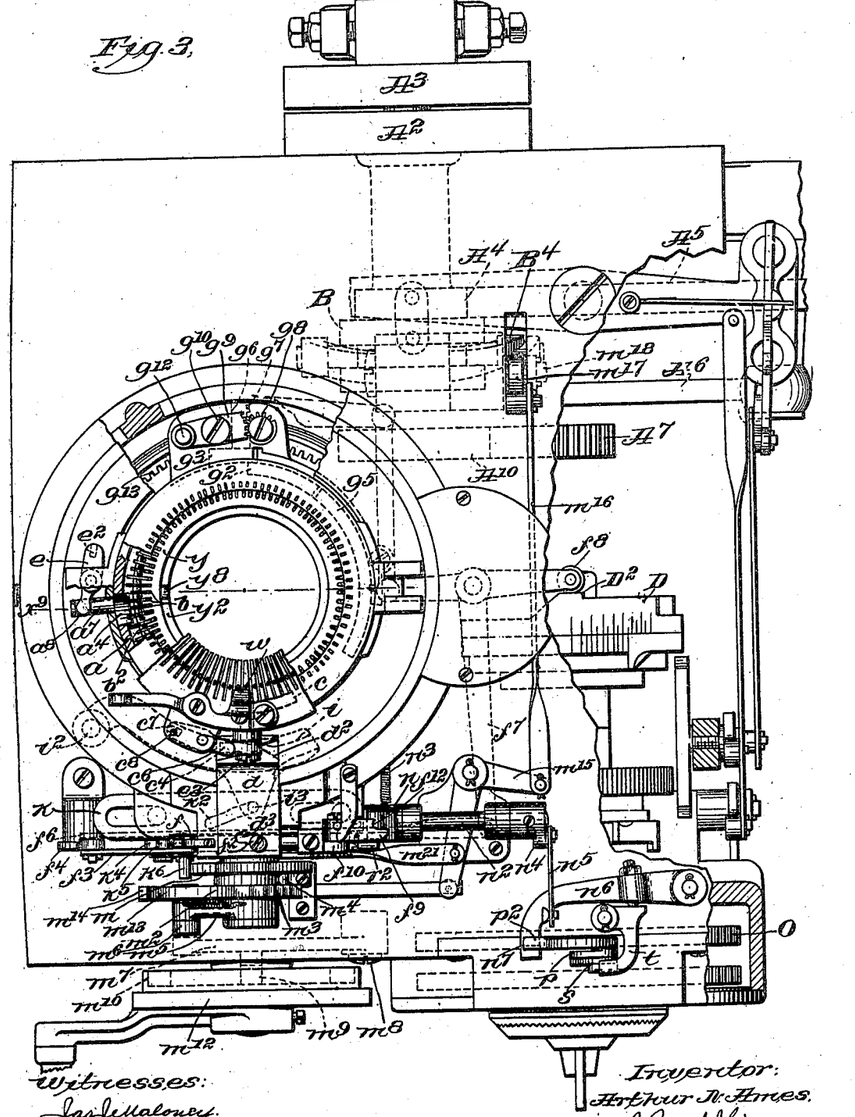
Fig. 3 is mainly a plan view on a larger scale, parts being broken away to show mechanism below.
Figures 5, 6:
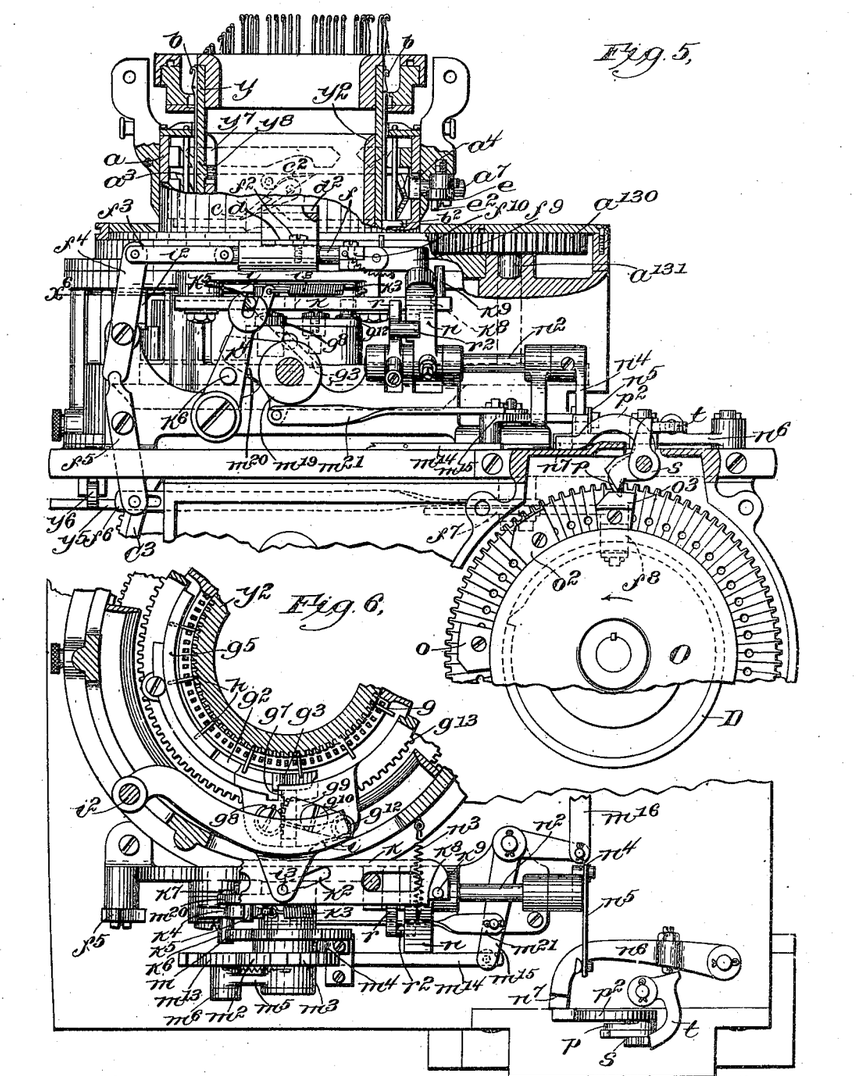
Fig. 5 is a partial side elevation, partly in section.
Fig. 6 is a horizontal section on line $x^6$ of Fig. 5.

The pinion $g^8$ which operates the switch $g^3$, as aforesaid, as best shown in Figs. 3 and 6, is acted upon by a segment $g^9$, pivoted at $g^{10}$ on the supplemental cam cylinder, and is provided with a projection $g^{12}$ which is arranged to engage the walls of a cam member $i$, the position of which is arranged to be shifted by means of suitable pattern mechanism. During the rotation of the cam cylinder, therefore, the switch member $g^3$ will remain in such position as is determined by the position of the segment $g^9$, which in turn is determined by the cam member $i$ and the shifting of the said cam member in a direction radial to the axis of the cylinder will produce a corresponding shifting of the switch member $g^3$. As herein shown, the cam member $i$ is in the form of a lever pivoted at $i^2$, and having a projection or engaging portion $i^3$ which enters a slot $k^2$ in a slide member $k$, the walls of said slot being inclined so that a longitudinal movement of the slide $k$ will produce a corresponding movement of the lever $i$ in a direction radial to the axis of the cylinder. The said lever $i$ is under the control of two sets of pattern mechanism, one of said sets determining the beginning and ending of the lace work, and the change necessary when part of the needles are rendered inoperative to knit the bottom of the foot, while the other set determines the appearance or nature of the lace work itself, and, for convenience, the latter set of pattern mechanism will be described first.

The slide $k$ is normally held in the position shown in Figs. 5 and 6 by means of a spring $k^3$, which is connected at one end with a fixed portion of the frame, and at the other end with a lever $k^4$, which has a connection with the slide $k$, the said lever being shown as forked, while the forked members embrace a pin or projection $k^5$ from the slide. In this position of the slide the switch $g^3$ projects into the cam cylinder to its fullest extent, so as to operate all the blind needles therein, thus preventing the knitting needles controlled by said blind needles from operating during such number of courses as may be determined by the configuration of a suitable pattern wheel $m$, Figs. 2 and 6, which is arranged to act upon a projection $k^6$ from the lever $k^4$. The said pattern wheel $m$ has an irregular shaped surface so as to move the slide $k$ away from its normal position to the opposite extreme position, thereby withdrawing the switch member $g^3$ from the cam cylinder. This permits the operation at intervals of the knitting needles controlled by the blind needles to knit in the threads not previously acted upon.

During the knitting of the leg of the stocking, the pattern wheel is rotated, causing the needles used for the lace effect to operate intermittingly in accordance with the shape of said pattern wheel, the feed of the pattern wheel being accomplished by means of a pawl $m^2$, Fig. 2, acting on a ratchet wheel $m^3$, connected with the pattern wheel $m$, the said ratchet wheel $m^3$ being frictionally held by a brake or spring $m^4$. The feed pawl $m^2$ is pivotally connected to an arm $m^5$, which is connected by means of a link $m^6$ with a lever $m^7$ pivoted at $m^8$ and having a cam roll or projection $m^9$, which enters a cam groove $m^{10}$ in a continuously rotating disk $m^{12}$. The pawl $m^2$ moves back and forth continuously throughout the operation of the machine, but the pattern wheel $m$ is arranged to be stopped by throwing the said pawl out of the path of the ratchet teeth $m^3$ at such times as may be necessary.

During the knitting of the heel and toe it is obviously essential that the blind needles should not be operated upon, since all the needles employed in the reciprocating knitting operation must be left in position to be controlled by the main cam cylinder and the needle elevating and needle depressing cams. The pattern wheel $m$, therefore, is stopped at this period of the operation, and at the same time the slide $k$ is moved to such a position as to cause the withdrawal of the switch $g^3$ from the blind needle cam cylinder, so that the blind needles are not lifted in the travel of said cylinder.

Figure 4:
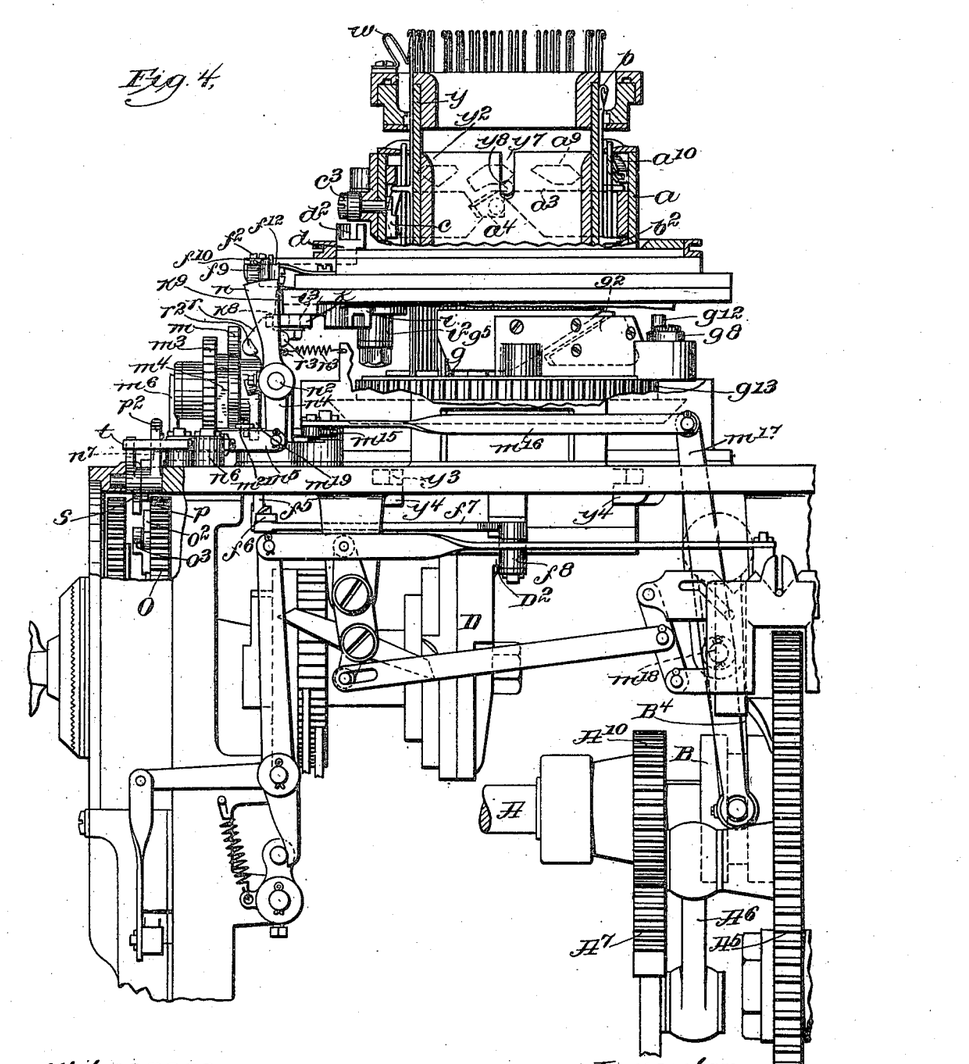
Fig. 4 is a partial rear elevation of the machine, partly in section.

To stop the feed of the pattern wheel the pawl $m^2$ is provided, as best shown in Figs. 2 and 3, with a tail or projection $m^{13}$, which is arranged to be acted upon by the upturned end of a slide $m^{14}$ connected with an elbow lever $m^{15}$ which in turn is connected by a link $m^{16}$ with a lever $m^{17}$ pivoted at $m^{18}$ (Figs. 4 and 9), and connected with a lever $B^4$, which operates the clutch B to change the cylinder from rotary to oscillating movement. Thus when the shift takes place, the slide $m^{14}$ is pulled against the tail $m^{13}$ of the pawl $m^2$, thus rocking the same on its pivot and holding it out of engagement with the ratchet teeth. It is necessary at this period in the operation that the switch $g^3$ should be withdrawn from the path of the butts of the blind needles, and it may happen, of course, that the pattern wheel $m$ will be stopped at a time when one of the depressions is in the path of the projection $k^6$, which would leave the slide $k$ in such a position as to cause the switch $g^3$ to project into the cam cylinder.

In order to insure that the slide $k$ shall be in the opposite position when there is no lace work to be done, the lever $k^4$ is arranged to be acted upon by an additional controlling device $m^{19}$, shown as an elbow lever pivoted concentrically with the pattern wheel and provided with a cam projection $m^{20}$, which is arranged to engage the projection $k^7$, in line with the projection $k^6$, so as to push the slide $k$ to the position to which it is pushed by the projecting parts of the pattern wheel $m$ and lock the same in such position during the reciprocating knitting operation. The said elbow lever $m^{19}$ is shown as connected by means of a link $m^{21}$ (Figs. 5 and 6) with the elbow lever $m^{15}$ which has been previously described as operating the member $m^{14}$ which stops the feed of the pattern wheel $m$, so that at the same time the feed is stopped, the elbow lever $m^{19}$ is thrown into such a position as to carry the slide $k$ to the left, and cause the switch $g^3$ to be withdrawn from the cam cylinder. Thus, during the reciprocating movement when the solid knitting is taking place at the heel and toe, the blind needles do not operate at all. If the lace effect is to be carried down along the instep, however, the sole of the stocking at the same time being knit solid, it is necessary when the circular knitting begins, for the purpose of completing the foot, to control the blind needles so that they will operate only in that part of the cylinder where the instep portion is being knit. For this purpose the slide $k$ is arranged to have an intermediate position in which the switch $g^3$ projects inward only far enough to engage the long butt blind needles, the said slide, however, being moved from such intermediate position to the position in which the switch is entirely withdrawn for the purpose of determining the lace pattern, as in the operation previously described. For this purpose the slide $k$, which, as previously stated, is moved in one direction by the spring $k^3$, is provided with a stop suitably controlled, which limits such spring-controlled movement so that the complete sets of movements of the slide consist in its movement in one direction under the influence of the pattern wheel $m$, and its movement in the opposite direction to an extent limited by the said stop, or not, as the case may be, so that while the long butt blind needles are caused to operate in accordance with the pattern wheel, as before, the short butt blind needles are not operated at all, if the stop is in place, whereby the lace effect is carried down over the instep while the sole is knit solid. This stop is shown as a lever $n$, Figs. 4, 5, 6 and 7, arranged to coöperate with a shoulder $k^8$ on the slide $k$, the said lever $n$ being mounted on a rockshaft $n^2$ and yieldingly drawn toward the slide by a spring $n^3$. The rockshaft $n^2$ is provided with an arm $n^4$ connected by means of a link $n^5$ with a lever $n^6$ pivoted on top of the table, the said lever $n^6$ being movable to three different positions by means of suitable pattern mechanism. As shown in Fig. 6, the lever $n^6$ is in the position in which the lace work is being formed entirely around the leg of the stocking.

When the shift takes place from circular to reciprocating knitting for the purpose of knitting the heel, the lace work pattern wheel is stopped and the slide $k$ is held in such position as to withdraw the switch entirely from the path of the blind needles by means of the elbow lever $m^{19}$ (Fig. 5), the construction and operation of which has been previously described. At the time when the shift is again made to circular knitting to knit the foot after the heel has been knit, it is necessary to bring the switch cam $g^3$ to such a position that it will engage only the blind needles having the long butts, these being the ones which control the lace effect over the instep. This operation is controlled by means of a pattern lug $o$ on the main pattern wheel O which engages the tail $p$ on the elbow lever or stop $p^2$, the end of which lies in the path of the lever $n^6$, so as to prevent the said lever $n^6$ from moving in response to the action of the spring $n^3$. The pattern member $o$ is of such shape as to lift the stop $p^2$ a distance sufficient to clear the end of the lever $n^6$, but without carrying it out of the path of a shoulder $n^7$ on the lever $n^6$, thus allowing the rock shaft $n^2$ to turn until the stop $n$ lies in the path of the shoulder $k^8$. This limits the return movement of the slide $k$ each time it is released by the main lace pattern cam $g$, so that the switch $g^3$ will only be projected far enough into the cylinder to engage the long butts. After the foot has been finished, a still higher projection $o^2$ on the pattern wheel O acts upon the tail portion $p$, and lifts the stop $p^2$ entirely out of the path of the lever $n^6$, thus permitting the rock shaft $n^2$ to make its full movement, and to cause a supplemental stop $r$ to be brought into the path of the shoulder $k^8$, thus locking the slide and preventing any further movement thereof until the said stop $r$ is moved out of the path of the shoulder $k^8$. This is accomplished by means of a pattern block $o^3$ on the pattern wheel O, which is out of alinement with the pattern-blocks $o$ and $o^2$ (Figs. 4 and 7), and acts upon an elbow lever $s$, one end of which engages a pivoted lever $t$ which, in turn, acts upon the lever $n^6$ to move the same to the position shown in Fig. 6 where it is held by the stop $p^2$ which then drops in front of the said lever.

The supplemental stop $r$ is frictionally mounted on the rock-shaft $n^2$, and is provided with stops $r^2$ and $r^3$ which project into the path of the stop $n$ at opposite sides, there being sufficient lost motion between these stops to permit the stop $n$ to move into the path of the shoulder $k^8$ without correspondingly moving the said supplemental stop $r$. When the dropped stitch lace effect or the dropped stitch only is carried completely around the leg of the stocking, it is obviously necessary to restore the drop stitch needles to operative position during the knitting of the heel, foot and toe, so as to get the solid knitting along the heel, sole and toe. It becomes necessary, therefore, to shift the slide $d$, the operation of which has previously been described, prior to the knitting of the heel, the said slide not being further operated until the stocking is finished, since the stitches over the instep are dropped on account of the actual removal of certain of the needles from the cylinder. The shifting of the slide $d$ is accomplished indirectly through the operation of the pattern blocks $o$, $o^2$ and $o^3$, above described, being directly accomplished by the action of the slide $k$, which is provided with a projection $k^9$, which is arranged to engage a swivel member $f^9$ which has a pivotal connection at $f^{10}$ with the rod $f$, which operates the slide $d$. The swivel member $f^9$ has a recess $f^{12}$ (Figs. 3 and 7), the said recess being arranged to come into the path of the projection $k^9$ just prior to the changing from the rotary to the reciprocating movement of the cylinder. To bring the said recess $f^{12}$ into the path of the projection $k^9$, the said swivel member $f^9$ is arranged to be acted upon by the lever $n$, which causes the swivel $f^9$ to turn upon its pivot $f^{10}$ until it brings the recess $f^{12}$ into the path of the projection $k^9$ at which time it arrests the lever $n$ so that the same does not come into the path of the shoulder $k^8$ during the next movement of the slide $k$. The movement of the slide $k$, therefore, is completed and causes the projection $k^9$ to shift the slide $d$, and thereby close the switch $c$ and push in the cam $a^4$, thereby causing the drop-stitch needles to be returned to the main cam cylinder-ledge $a^3$, and retained therein by the cam $a^4$, so that the said needles enter into the subsequent knitting operations.

Since the drop-stitch needles are lowered before reaching the knitting point, and remain below the work until placed in operation, as above described, during the knitting of the heel, foot and toe, there is no thread under the hook to open the latch as the needle is pushed up into operative position. For the purpose of insuring that the latches shall be opened, therefore, the machine is provided with a latch engaging device $w$, Figs. 1, 2 and 3, consisting of a projecting blade located on that part of the cam cylinder where the needles come up, so as to catch the end of each latch as the needle rises, and open the same.

For convenience in assembling the needle cylinder, the said cylinder is made in two parts, the part $y$ for the regular knitting needles being inserted from above, and held in place by the cylinder for the blind needles which is inserted from below. The blind needle cylinder $y^2$ is shown as provided with ears $y^3$ which overlie lugs $y^4$ formed on the frame, so that the lower cylinder $y^2$ is held in place by turning the same after the manner of a bayonet joint. The said lower cylinder is further provided with a projection $y^5$ which is arranged to be held by means of a latch $y^6$ pivotally connected to the frame and adapted to overlie the said projection in order to hold the lower cylinder in place. The said lower cylinder is provided at the top with a slot $y^7$ which receives an inward projection $y^8$ from the upper cylinder, the upper cylinder thus being properly positioned and prevented from turning. The upper and lower cam cylinders are disconnected from each other, and, in order that they may be driven in unison, they are provided, respectively, with gears $a^{13}$ and $g^{13}$, which mesh respectively with gears $a^{130}$ and $g^{130}$ upon an idler shaft $a^{131}$ which has a suitable bearing in the frame. The lower cam cylinder is directly driven from the bevel gear $C^3$, as has been previously described.

Claims.

1. In a circular knitting machine, the combination with the long and short butt needles; of special needles having butts shorter than those of the regular short butt needles and being located at intervals in the cylinder; means operating on said special needles during the circular knitting operation to remove them from the influence of the knitting cams; means for restoring said special needles to the influence of the knitting cams prior to the reciprocating knitting operation; and pattern mechanism for controlling the operation of said shifting and restoring means.

2. In a circular knitting machine, the combination with the regular long and short butt needles; of special needles having butts of minimum length; a main cam ledge; a supplemental cam ledge; a switch located adjacent to each ledge to coöperate with said minimum butt needles; and a common actuating device for said switches.

3. In a circular knitting machine, the combination with the main cam ledge; of a supplemental cam ledge located in the cam cylinder; a plurality of special drop stitch needles; means for changing the movement of the cylinder from rotary to reciprocating; and devices coöperating with said means for shifting said drop stitch needles from one cam ledge to the other.

4. In a circular knitting machine, the combination with a plurality of special drop stitch needles; of means for removing said drop stitch needles from the influence of the knitting cams; a slide member adapted to actuate said means; pattern mechanism coöperating with the clutch which shifts the cylinder from reciprocating to rotary movement; said clutch; and separate means for operating said drop stitch actuating means in the opposite direction.

5. In a circular knitting machine, the combination with the regular long and short butt needles; of drop-stitch needles having still shorter butts; a switch located in the main ledge of the cam cylinder; and means for withdrawing the said switch from the path of the drop-stitch needles only, whereby said drop-stitch needles may be deflected to a supplemental ledge below.

6. In a circular knitting machine, the combination with the regular long and short butt needles; of drop stitch needles having still shorter butts; a switch located in the main ledge of the cam cylinder; means for withdrawing the said switch from the path of the drop-stitch needles only, whereby said drop-stitch needles may be deflected to a supplemental ledge below; and a switch for restoring said drop-stitch needles to the main ledge.

7. In a circular knitting machine, the combination with the regular long and short butt needles; of drop stitch needles having still shorter butts; a switch located in the main ledge of the cam cylinder; means for withdrawing the said switch from the path of the drop-stitch needles only, whereby said drop-stitch needles may be deflected to a supplemental ledge below; a switch for restoring said drop-stitch needles to the main ledge; and pattern mechanism for operating both switches.

8. In a circular knitting machine, the combination with the knitting needles; of blind needles coöperating with certain of said knitting needles to push the same above the line of knitting; a switch cam to control the operation of said blind needles; and pattern mechanism to control the operation of said switch cam.

9. In a circular knitting machine, the combination with the main cam cylinder provided with knitting cams; of a supplemental cam cylinder; blind needles controlled by said supplemental cam cylinder, said blind needles being in alinement with certain of the regular needles so as to coöperate therewith; and a switch located in said supplemental cam cylinder to control the operation of said blind needles, substantially as described.

10. The combination with the regular knitting needles; of blind needles coöperating with certain of said regular needles, said blind needles being arranged in two sets having long and short butts; a cam cylinder for said blind needles; a switch connected with said cam cylinder; and means for moving said switch to selectively control the operation of said blind needles.

11. The combination with the regular knitting needles; of the long and short butt blind needles coöperating therewith; a cam cylinder for said blind needles; a switch carried by said cam cylinder to coöperate with said blind needles; and means for moving said switch from one to another of three positions to cause the same to coöperate with all of the blind needles, none of the blind needles, or long butt blind needles only.

12. The combination with the regular needles; of long and short butt blind needles; a cam cylinder for said blind needles; a switch coöperating with said blind needles; a pattern wheel to produce the full movement of said switch; and independent means for producing a partial movement of said switch whereby said switch is caused to operate on the long butt blind needles only.

13. The combination with the long and short butt blind needles; of the cam cylinder and switch to control the operation thereof; a spring actuated slide to operate said switch; a pattern wheel coöperating with said slide against the action of the spring to withdraw the switch entirely from the path of the needle butts; a stop to limit the spring movement of said switch; and independent pattern mechanism to operate said stop.

14. The combination with drop-stitch needles; of a switch for withdrawing said drop-stitch needles from the knitting position; blind needles to coöperate with certain of the regular knitting needles to carry the same out of the knitting position; switches coöperating with said drop-stitch needles and said blind needles; and common means for restoring said switches to their normal position.

15. The combination with the knitting needles; of blind needles coöperating therewith; a switch to control said blind needles; a slide operating said switch; a main stop co-acting with said slide to hold the same in either of two positions; a supplemental stop to hold said slide in a third position; and a lost motion connection between said main and supplemental stops, substantially as described.

16. In a knitting machine provided with regular needles and coöperating blind needles, a needle cylinder made in two parts, the upper part being supported on the lower; and means for supporting the lower part from below.

In testimony whereof, I have signed my name to this specification in the presence of two subscribing witnesses.

ARTHUR N. AMES.

Witnesses:
M. E. COVENEY,
H. J. LIVERMORE.